UNITED STATES PATENT OFFICE.

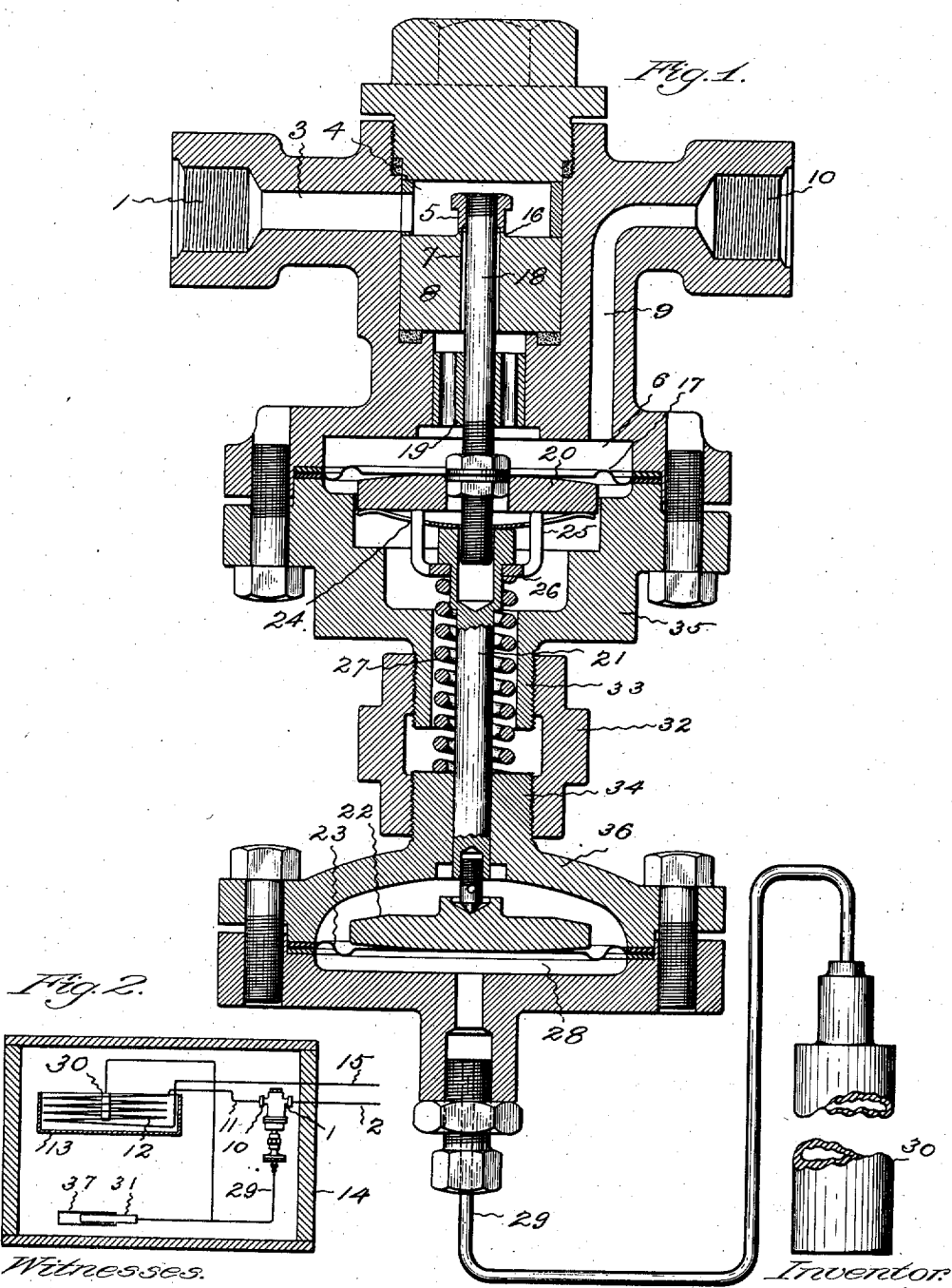

ARTHUR H. EDDY, OF WINDSOR, CONNECTICUT, ASSIGNOR OF ONE-HALF TO CHARLES E. SHEPARD, OF HARTFORD, CONNECTICUT.

AUTOMATIC EXPANSION-VALVE FOR REFRIGERATING APPARATUS.

No. 853,505.     Specification of Letters Patent.     Patented May 14, 1907.

Application filed January 26, 1906. Serial No. 297,978.

*To all whom it may concern:*

Be it known that I, ARTHUR H. EDDY, a citizen of the United States, residing at Windsor, in the county of Hartford and State of Connecticut, have invented a new and useful Automatic Expansion-Valve for Refrigerating Apparatus, of which the following is a specification.

This invention relates to an expansion valve for refrigerating apparatus which automatically opens and closes for regulating the flow of the refrigerating fluid to the expansion coil according to the temperature of the compartment in which the expansion coil is located.

The object of the invention is to produce a simple and durable apparatus of this nature which is very sensitive and may be arranged so as to be closely controlled by the temperature of the atmosphere of the compartment being cooled or by the temperature of a liquid in which the expansion coil may be submerged or by the mean temperature of the liquid and the atmosphere in the compartment.

The apparatus illustrated as embodying the invention has a valve for controlling the flow of refrigerating fluid, usually ammonia, which is so connected with a diaphragm on the expansion side that the pressure of the refrigerating fluid tends to shut the valve and stop the flow of the fluid, while the tension of a spring or springs thrusting against the opposite side of the diaphragm tends to open the valve and permit the flow of fluid, the spring tension being governed by the condition of a diaphragm which is subject to the expansion and contraction of a confined fluid, preferably alcohol, that is exposed to the temperature of the atmosphere of the compartment being cooled, or of the liquid in which the expansion coil is submerged, or to both the temperature of the atmosphere and the liquid.

Figure 1 of the drawings shows a central vertical section of one form of the valve. Fig. 2 is a diagrammatic view illustrating an arrangement of the apparatus in a refrigerating box.

The inlet 1 of this valve is designed to be connected with a pipe 2, which leads from the receptacle containing the refrigerating fluid, preferably ammonia in liquid form and under pressure. A passage 3 connects the inlet and the pressure chamber 4 over the valve 5. This chamber communicates with the expansion chamber 6 through the port 7 in the block 8, and a passage 9 leads from the expansion chamber to the outlet 10 that is designed to be connected by a pipe 11 with one end of the expansion coil 12 in which the refrigerating fluid is allowed to expand for absorbing heat from the compartment to be cooled. This coil in the drawings is indicated as arranged in a tank 13, preferably containing brine, in a refrigerating box 14. The other end of the expansion coil is designed to be connected by a pipe 15 with the pump which is employed to cause the circulation of the refrigerating fluid.

About the upper end of the port through the block is a valve seat 16 and the valve which is movable on the pressure side toward and from the seat is mounted on a stem 18 that is attached to the diaphragm 17 that is subject to the pressure of the expanded refrigerating fluid in the expansion chamber and coil. The valve stem is guided in its movement by the perforated plug 19.

Underneath the valve diaphragm is a pad 20 and held up against this pad by a spindle 21 that is supported by a pad 22 on a diaphragm 23, is a spider-shaped spring 24. The pad 20 is also held up by the legs 25 of the washer 26 which is supported on the spiral spring 27.

Below the spring diaphragm 23 is the thermostatic pressure chamber 28. This chamber is connected by a pipe 29 with one or more hydro-thermic receptacles 30 and 31 located where desired in the compartment to be cooled. This chamber and these pipes and receptacles are designed to be filled with an expansible fluid, such as alcohol, so that the expansion and contraction of the fluid due to variations of its temperature will act upon the spring diaphragm and thus influence the tension of the springs against the valve diaphragm.

The initial tension of the springs is adjusted by turning the nut 32 on the hubs 33 and 34 which are provided with right and left-hand threads, and drawing together or separating the frames 35 and 36 which contain the springs and the spring spindle.

As illustrated in Fig. 2, one regulating fluid receptacle may be located in a brine tank and one may be located in the atmosphere in any part of the compartment to be cooled, and, of course, either one could be used without the other. If a regulating fluid receptacle is only used in the brine tank it is adjusted down into the brine sufficiently for the changes of the temperature of the brine to cause the necessary expansion and contraction of the regulating fluid to effect the necessary tension of the springs to produce the desired result. If the regulating fluid receptacle is only subjected to the temperature of the atmosphere in the cold storage compartment the receptacle is adjusted in or out of an insulated case or shield 37 to the proper amount to cause the temperature to effect the necessary expansion or contraction of the regulating fluid to effect the desired result. If a regulating fluid receptacle is placed in a brine tank and another in the atmosphere at another locality in the compartment and both are connected, as shown in Fig. 2, the receptacles are adjusted so that the mean temperature of the brine and the atmosphere acting on the confined fluid will produce the desired effect. This arrangement obviates the necessity of carefully proportioning the size of the regulating fluid receptacle and quantity of regulating fluid to the capacity of the expansion coils.

In this apparatus the pressure of the expanded refrigerating fluid is exerted on the valve diaphragm in such manner as to tend to close the valve which controls the flow of the fluid to the expansion coil. The pressure of the springs tends to open the valve and permit the flow of fluid to the refrigerating coil and the tension of the springs is governed by the pressure of the regulating fluid on the spring diaphragm, which pressure depends of course upon the condition of the fluid due to the temperature to which it is subjected. In other words the opening or closing of the refrigerating fluid valve is determined by the difference between the refrigerating fluid pressure on the valve diaphragm and the spring pressure on the valve diaphragm as varied by the expansion and contraction of the regulating fluid due to its temperature, that is, the refrigerating fluid pressure closes the valve and the spring pressure controlled by the temperature of the compartment cooled by the refrigerating fluid opens the valve.

When the temperature in the compartment cooled drops to the desired degree the contraction of the regulating fluid relieves the spring presure on the under side of the valve diaphragm to such an extent that the fluid pressure on the upper side of the diaphragm will close the valve and stop the flow of refrigerating fluid to the expansion coil. When the temperature in the compartment rises above the desired degree the expansion of the regulating fluid increases the spring tension on the under side of the valve diaphragm to such an extent that it overcomes the refrigerating fluid pressure and opens the valve and allows sufficient refrigerating fluid to flow to the expansion coil to bring about a drop in the temperature.

The invention claimed is:—

1. In a refrigerating apparatus, the combination of a valve for controlling the flow of refrigerating fluid, a diaphragm located on the outlet side of the valve adjacent to the fluid port and exposed to the pressure of the refrigerating fluid that passes the valve, a stem extending through the port and joining said valve and diaphragm, a spring thrust against the diaphragm in opposition to the pressure of the refrigerating fluid, a diaphragm parallel with the first-mentioned diaphragm, a stem extending between the two diaphragms, and a thermal regulator subject to the temperature of the refrigerating fluid on the expansion side of the valve communicating with and adapted to affect the last-mentioned diaphragm oppositely to the refrigerating fluid, substantially as specified.

2. In a refrigerating apparatus, in combination, an expansion coil, a valve for controlling the flow of refrigerating fluid to the coil, a diaphragm located on the outlet side of the valve adjacent to the fluid port, and exposed to the pressure of the refrigerating fluid that passes the valve, a stem extending through the port and joining said valve and diaphragm, a spring thrusting against the diaphragm in opposition to the pressure of the refrigerating fluid, a diaphragm parallel with the first-mentioned diaphragm, a stem extending between the two diaphragms, and a thermal regulator located adjacent to and affected by the temperature of the expansion coil, and communicating with and adapted to affect the last-mentioned diaphragm oppositely to the refrigerating fluid, substantially as specified.

3. In a refrigerating apparatus in combination, a valve for controlling the flow of refrigerating fluid, a diaphragm located on the expansion side of the valve and subject to the pressure of the refrigerating fluid that passes the valve, a stem connecting the valve and said diaphragm, a spring thrusting against the diaphragm in opposition to the pressure of the refrigerating fluid, a diaphragm having an upwardly extending stem, a spring between said stem and the under side of the first-mentioned diaphragm, and a thermal regulator subject to the temperature of the refrigerating fluid on the expansion side of the valve connected with and adapted to act upon the last-mentioned diaphragm in opposition to the pressure of the refrigerating fluid, substantially as specified.

4. In a refrigerating apparatus in combination, an expansion coil, a brine tank containing the expansion coil, a regulating device connected with the expansion coil, said device comprising a valve for controlling the flow of refrigerating fluid to the coil, a diaphragm on the expansion side of the valve and subject to the pressure of the refrigerating fluid for closing the valve, a spring arranged to open the valve against the fluid pressure, a diaphragm having a stem arranged to thrust against the first-mentioned diaphragm, a thermal regulator located in the brine tank and connected with the last-mentioned diaphragm, and a thermal regulator located in the compartment cooled by the expansion coil and connected with the last mentioned diaphragm in such manner that variations of the mean temperature of the brine and the atmosphere in the compartment will cause fluctuations of the last-mentioned diaphragm, substantially as specified.

5. In a refrigerating apparatus in combination, a valve for controlling the flow of refrigerating fluid, a diaphragm arranged on the expansion side of the valve and subject to the pressure of the refrigerating fluid for closing the valve, a flat spring and a spiral spring arranged under the diaphragm in opposition to the pressure of the refrigerating fluid, for opening the valve, a diaphragm arranged to determine the tension of one of the springs, and a thermo regulator adapted to be acted upon by the temperature produced by the refrigerating fluid on the expansion side of the valve, for actuating the spring regulating diaphragm, substantially as specified.

ARTHUR H. EDDY.

Witnesses:
HARRY R. WILLIAMS,
ETHEL M. LOWE.